United States Patent [19]

Brown et al.

[11] 4,402,815

[45] Sep. 6, 1983

[54] ELECTRODES CONTAINING NICKEL ALLOYS AS ELECTROCATALYSTS

[75] Inventors: David E. Brown, Weybridge; Mahmood N. Mahmood, Walton-on-Thames; Alan K. Turner, Southend-on-Sea; Dermott Wood, Sunbury-on-Thames, all of England

[73] Assignee: The British Petroleum Company p.l.c., London, England

[21] Appl. No.: 194,293

[22] PCT Filed: Sep. 21, 1979

[86] PCT No.: PCT/GB79/00154

§ 371 Date: May 1, 1980

§ 102(e) Date: May 1, 1980

[87] PCT Pub. No.: WO80/00715

PCT Pub. Date: Apr. 17, 1980

[30] Foreign Application Priority Data

Sep. 21, 1978 [GB] United Kingdom ............... 37556/78

[51] Int. Cl.³ .............................................. C25B 11/06

[52] U.S. Cl. ............................. 204/290 R; 204/290 F; 204/293; 252/425.3

[58] Field of Search ............... 204/290 H, 290 R, 293; 75/170

[56] References Cited

U.S. PATENT DOCUMENTS

| 3,291,714 | 12/1966 | Hall et al. | 204/256 |
| 3,759,842 | 9/1973 | Bianchi et al. | 252/447 |
| 3,833,357 | 9/1974 | Bianchi et al. | 75/121 |
| 4,152,240 | 5/1979 | Kuo | 204/290 R |

FOREIGN PATENT DOCUMENTS

| 699534 | 12/1964 | Canada | 204/290 H |
| 1582294 | 6/1970 | France. | |
| 2015578A | 9/1979 | United Kingdom. | |
| 2015579 | 9/1979 | United Kingdom. | |

Primary Examiner—F. Edmundson
Attorney, Agent, or Firm—Brooks, Haidt, Haffner & Delahunty

[57] ABSTRACT

An electrode having a coating of face-centered cubic alloy of nickel and molybdenum or tungsten.

3 Claims, 2 Drawing Figures

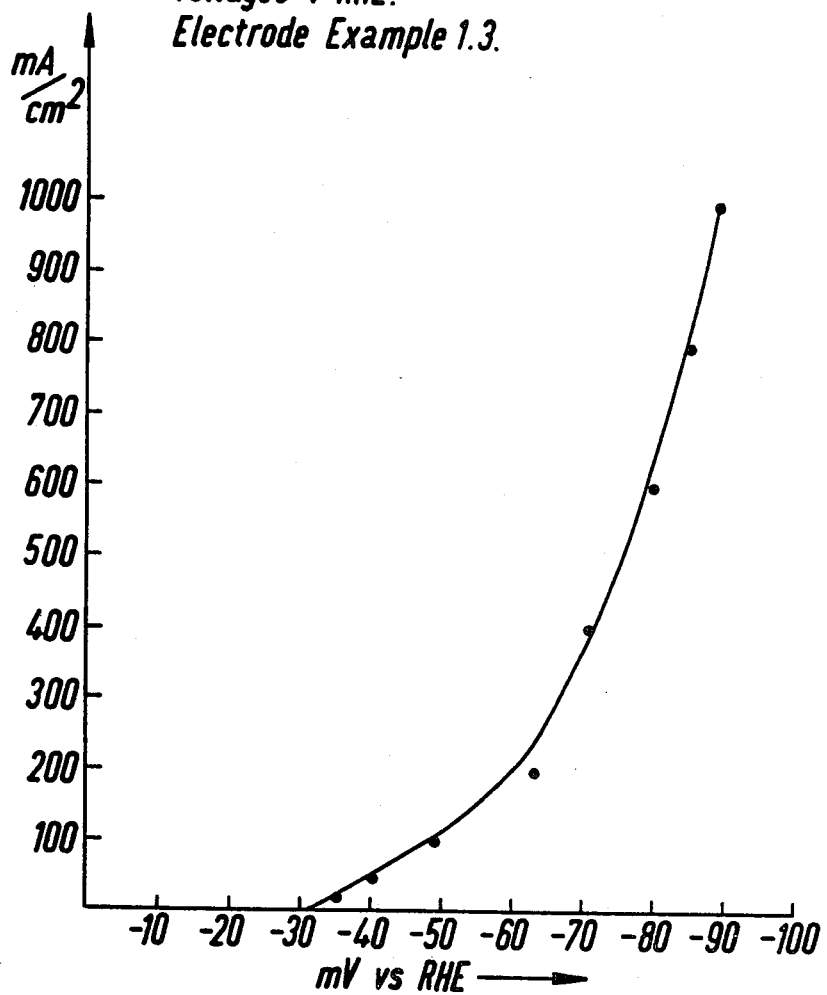

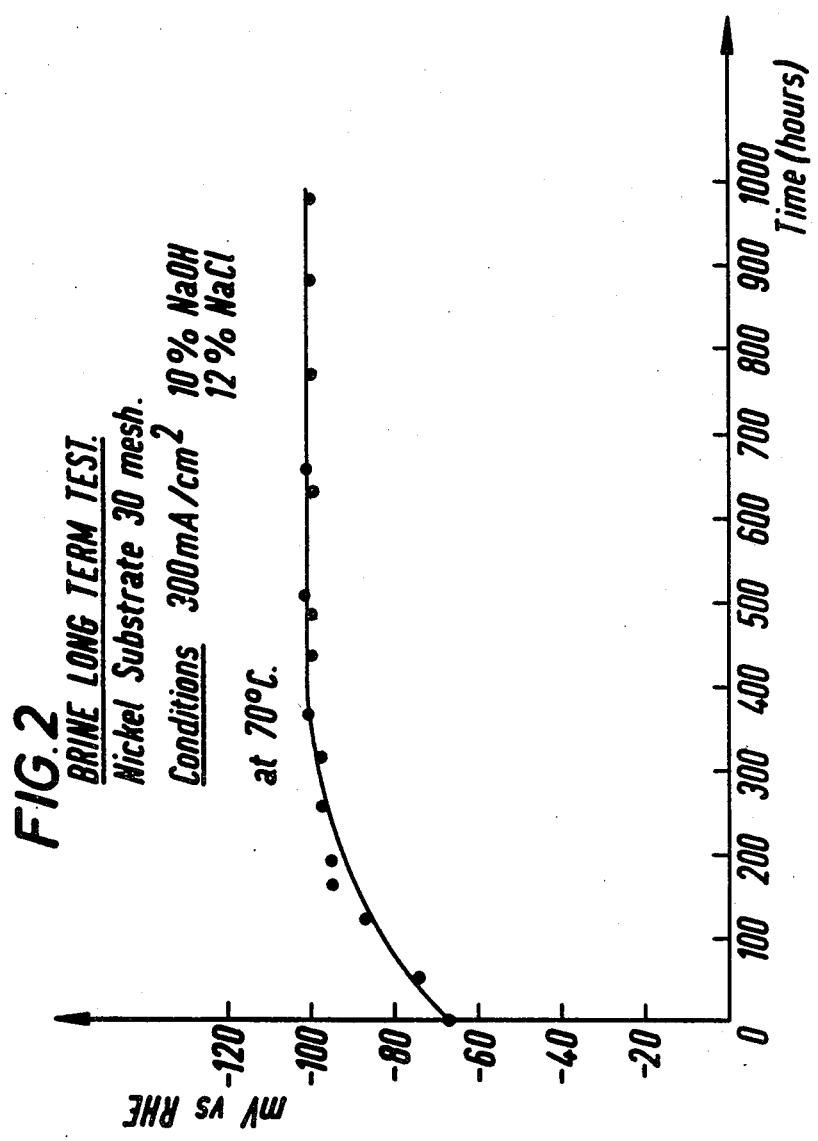

ELECTRODES CONTAINING NICKEL ALLOYS AS ELECTROCATALYSTS

The present invention relates to a method of preparing active electrodes and in particular to such electrodes having improved efficiency and/or stability and the use thereof in electrochemical cells.

An electrochemical cell is a device which has as basic components at least one anode and one cathode and an electrolyte. The cell may use electrical energy to achieve a chemical reaction such as the oxidation or reduction of a chemical compound as in an electrolytic cell. Alternatively, it can convert inherent chemical energy in a conventional fuel into low voltage direct current electrical energy as in a fuel cell. The electrodes, particularly the cathode, in such a cell may be of relatively inexpensive material such as iron or nickel. However, electrodes of such material tend to have low activity. These problems may be overcome to a degree by using electrodes made with active precious metals such as platinum. These precious metals may be used as catalytic coatings on the surface of an electrode core of inexpensive material. Such catalyst coatings are termed electrocatalysts. The level of precious metal required for high activity and stability generally leads to high costs.

The above problems are particularly acute in electrochemical cells having a hydrogen electrode. Such electrochemical cells are used for several purposes such as for example, the electrolysis of water to produce hydrogen and oxygen, in chlorine cells in which brine is electrolysed and in fuel cells which generate power by the oxidation of hydrogen. Of these processes, the electrolysis of water is used on an industrial scale for producing high purity hydrogen.

In the case of the production of hydrogen and oxygen by the electrolysis of water, water is decomposed into its elements when a current, eg a direct current, is passed between a pair of electrodes immersed in a suitable aqueous electrolyte. In order to obtain the gases evolved in a pure and safe condition, an ion-permeable membrane or diaphragm is placed between the electrodes to prevent the gases mixing. The basic elements of this cell are thus two electrodes, a diaphragm and a suitable electrolyte which is preferably an alkaline electrolyte such as an aqueous solution of sodium hydroxide or potassium hydroxide due to their high conductivity and relatively low corrosivity.

In this case, the voltage, V, applied across the electrodes can be divided into three components, the decomposition voltage of water, $E_d$, the overvoltage at the electrodes, $E_o$, and the Ohmic loss in the inter-electrode gap which is the product of the cell current, I, and the electrical resistance (including the membrane resistance) of this gap, R.

Thus $V = E_d + E_o + IR$.

At 25° C. and at a pressure of one atmosphere, the reversible decomposition voltage of water is 1.23 V. However, in practice cells operate at voltages of 1.8 to 2.2 V, as a result, inter alia, of activation overvoltage.

Activation overvoltage results from the slowness of the reactions at the electrode surface and varies with the metal of the electrode and its surface condition. It may be reduced by operating at elevated temperatures and/or by using improved electrocatalysts, but increases with the current density of the electrode reaction. The use of cathodes containing precious metal electrocatalysts such as platinum, for example, does achieve a reduction in activation overvoltage. However, the technical advantage to be obtained by the use of such precious metal electrocatalysts is substantially offset by the expense. The use of mixed cobalt/molybdenum oxide as electrocatalyst has also been suggested. Such an electrode can be made by painting a nickel gauze with a mixed cobalt/molybdenum oxide electrocatalyst bonded with polytetrafluoroethylene (PTFE) followed by curing under hydrogen at 300° C. for 2 hours, which initially has an electrode potential, versus a reversible hydrogen electrode (RHE), of $-182$ mV at a current of 1000 mA/cm$^2$ and 70° C. The curing temperature is normally maintained at or below 300° C. to prevent any excessive sintering of the PTFE bonding which would result in loss of activity. The activity of this electrode also decreases substantially when left immersed in an alkaline solution on open circuit when no current is passed through the cell for a long time, as for example during a shut-down in industrial application. The electrode potential then rises to $-300$ mV versus RHE as a reference, at the same current density and temperature. This loss of activity and efficiency has hitherto prevented mixed cobalt/molybdenum oxide being considered as an alternative to precious metal electrocatalysts. The stability of electrodes produced by the above techniques has been improved by the addition of stabilising agents to the electrolyte to maintain their activity over a period of time.

It is an object of the present invention to produce active and stable electrodes which can be used in electrochemical cells.

It has now been found that electrodes of relatively higher activity and stability which do not need any added stabilising agents can be produced by coating said electrodes with a specific alloy as electrocatalyst.

Accordingly the present invention is an electrode having electrocatalysts deposited thereon, said electrocatalyst comprising a face-centred cubic alloy of nickel and either molybdenum or tungsten, said alloy containing between 5 and 30 atoms percent of molybdenum or tungsten.

The face-centred cubic alloy preferably contains between 10 and 20 atoms percent of molybdenum or tungsten.

The electrodes of the present invention may be produced by depositing compounds of nickel and molybdenum or tungsten on the electrode substrate from a homogeneous solution containing the respective metal compounds followed by thermal decomposition of the metal compounds to the corresponding metal oxide or mixed oxides and finally curing the oxide-coated substrate in a reducing atmosphere at elevated temperature to produce an electrocatalyst coating which contains the face-centred cubic alloy containing between 5 and 30 atoms percent of molybdenum or tungsten.

The metal electrode substrate on which the coating is carried out according to the present invention may be of a relatively inexpensive material such as for instance nickel, iron, copper, titanium, and alloys thereof or of other metallic substances plated with any of these materials. The substrate may be in the form of wire, tube, rod, planar or curved sheet, screen or gauze. A nickel screen or nickel plated iron substrate is preferred.

The metal compounds which may be present in the homogeneous solution are suitably compounds which are capable of thermal decomposition to the corresponding oxide. Examples of compounds which may be used include the nitrates and chlorides of nickel and the molybdates and tungstates, such as e.g. ammonium paramolybdate and ammonium tungstate. If a technique is used which enables the direct spraying of the metal oxides the metal compounds in such a case are the oxides.

The homogeneous solution of the metal compounds used for coating may be an intimate mixture of the respective solid metal compounds in their finely divided state, a solid solution of the metal compounds or a solution of the compounds in a solvent. The homogeneous solution suitably contains between 10 and 50 atoms percent, preferably between 20 and 40 atoms percent of molybdenum or tungsten, the remainder being nickel to obtain an electrocatalyst coating containing the alloys of the present invention. An intimate mixture of the solid metal compounds may be premixed or mixed immediately prior to contact with the substrate to be coated. An example of the latter is the case when the respective metal compounds are sprayed separately but simultaneously on to the substrate; if premixed, the mixture may for example be sprayed from a single spray gun. Where they are solutions in solvents, the solvent may be aqueous such as for example water, acidic or alkaline systems or aqueous ethanol, or organic solvents, e.g. methanol, ethanol, propanol, isopropanol, formamide or dimethyl formamide. The choice of a particular solvent will depend upon the solubility of the desired metal compounds in the solvent.

In certain cases where aqueous systems are used, there may be a tendency for one or more of the metal compounds to separate by precipation, particularly on standing the solution even for a relatively short time. For example an aqueous solution containing nickel nitrate and ammonium molybdate tends to precipitate a compound on standing. In this case the solution is no longer a homogeneous mixture of the recommended concentration and may therefore give unsatisfactory results. It has been found that this precipitation may be avoided, especially in the case of nickel/molybdenum systems by adding ammonia to the solution so as to bring the pH of the solution to about 9.

If the homogeneous solution is a liquid it may be applied to the substrate surface to be coated for example by dipping, spraying, brushing or by plating from a homogeneous solution. The coated substrate is thereafter heated at elevated temperature to decompose the metal compounds into the corresponding oxides. The decomposition is suitable carried out in air at a temperature between 250° and 1200° C., preferably between 300° and 950° C. The operation of applying a coat of the homogeneous solution to the substrate followed by thermal decomposition may be repeated several times to ensure adequate coverage of the substrate surface with the metal oxides.

If, on the other hand, the homogeneous solution of the metal compounds is a mixture of solids, whether or not premixed, it may be applied to the substrate by melt spraying techniques such as for example flame spraying or plasma spraying. If this type of technique is used, the steps of coating the substrates with the metal compounds and thermal decomposition of the coating are both effected in a single step. This is due to the relatively high temperature associated with such techniques whereby the metal compounds may be expected to decompose to their oxides.

The substrate coated with the metal oxides, whether from a homogeneous liquid or a mixture of solids, is then cured by heating in an oven in a reducing atmosphere at a temperature between 250° and 700° C. The reducing atmosphere is preferably hydrogen and the heating temperature is preferably between 350° and 600° C. Some variation in the optimum curing temperature may be achieved by varying the duration of the curing treatment.

The face-centred cubic alloy was characterised by X-ray diffraction (XRD) studies and cell parameters.

In carrying out the XRD studies, the X-ray diffractometer was calibrated using nickel powder (cell parameter, $a = 3.5235$ Å and copper $K\alpha$ radiation ($\lambda = 1.54184$ Å) was used for all the measurements referred to herein and in the Examples accompanying this specification.

The atomic percentages of molybdenum and tungsten in the various alloys formed were calculated using Vegard's law, taking the nickel powder cell parameter as $a = 3,5235$ Å and assuming the atomic radius of molybdenum to be 1.404 Å. On this basis an 80/20 Ni/Mo FCC alloy would have a cell parameter of $a = 3.6136$ Å. By interpolation, cell parameters of alloys of other compositions may be converted into atomic percentages. Similar methods were used for the nickel-tungsten FCC alloys, where the reference cell parameters used were $a = 3.5235$ Å for nickel powder and $a = 3.6198$ Å for 80/20 Ni/W FCC alloy.

It appears that the activity of the electrocatalytic coatings of the present invention is enhanced by the presence of at least some of the face-centred cubic alloy of Mo or W in Ni. This is evidenced by the presence of such an alloy as a major constituent in each of the electrocatalytic formulations exemplified. It would also appear that apart from the alloys present on the substrate surface other phases containing the metals are also present.

The steps of electrode preparation may be adapted to produce an appropriate level of catalyst loading on the substrate surface. The catalyst loading is suitably above 5 mg/cm² (based on the weight of the active species deposited on the substrate surface), preferably above 10 mg/cm². The eventual loading will depend upon the mechanical stability and integrity of the coating required, the substrate used and the cell in which the electrode is to be used. It has however been found that by using a method of electrode preparation according to the present invention very low electrode potentials of the order of −70 mV vs RHE using a current density of 1 Amp/cm² at 70° C. in 30% KON solution may be achieved. This degree of reduction in electrode potential will not only enable operation of the cells at high current density but will also significantly increase the economic efficiency of such cells.

FIG. 1 is a Polarisation Curve drawing the effect of current density on electrode potential.

FIG. 2 is a graph illustrating a Brine Long Term Test showing the effect overtime of the immersion of an electrode of the present invention in brine upon the activity of the electrode.

The data for the Polarisation Curve of FIG. 1 was obtained as follows.

An electrode was prepared according to the process described in Example 2 below except that the FCC alloy containing 60 atom % of nickel and 40 atom % of molybdenum was deposited on an 1×1 cm 80 mesh nickel substrate. The effect of current density on electrode potential was measured using a standard three compartment cell. The alloy coated nickel screen served as the anode and a reversible hydrogen electrode (RHE) was used as the reference electrode. The electrolyte used was 30% w/w aqueous potassium hydroxide solution. The cathode potentials achieved vs RHE over a range of current passed at 70° C. is shown in FIG. 1. The results show that the overvoltage remains below 90 over a wide range of current densities.

The data shown in FIG. 2 was obtained as follows. An electrode was prepared according to Example 2 below except that the FCC alloy containing 60 atom % of nickel and 40 atom % molybdenum was deposited on a 1×1 cm 30 mesh nickel screen. The electrochemical measurements were performed using a three compartment cell with circulating electrolyte. The input feed to the cell contained 12 percent w/v sodium chloride and 10 percent w/v sodium hydroxide solution, and the flow adjusted to maintain the sodium hydroxide content of the catholyte by a Nafion (Regd. Trade Mark) caton exchange membrane. The anode used had an active coating so that a reasonable total cell voltage was achieved.

A constant current of 300 mA was passed through the cell, and the experiment was conducted at 70° C. The activity of the cathode was measured versus a saturated calomel electrode (SCE). All electrode potentials were IR corrected using the interrupter technique, and are quoted with respect to the reversible hydrogen electrode (RHE). The results of this test are represented in FIG. 2. The results suggest that after initial loss the electrode activity remains stable at $100\pm10$ mV vs RHE for greater than 1000 hours in a brine/caustic environment. The electrode can therefore be considered active and stable in the caustic/brine environment.

The invention is further illustrated with reference to the following examples:

EXAMPLE 1

NiMo Alloy

Solutions containing required atomic ratios of nickel and molybdenum were prepared by mixing measured volumes of 3.4 molar nickel nitrate hexahydrate and one-seventh molar ammonium paramolybdate. The resulting solutions were stabilised by the addition of concentrated ammonia until a clear dark blue solution was formed.

A coating was prepared by spraying a nickel mesh with a coating solution containing 60 atomic percent nickel and 40 atomic percent molybdenum. The coated mesh was then heated to red heat in a naked flame to decompose the metal salts to the oxides. This operation was repeated until a satisfactory coating had been obtained. The resulting oxide coated mesh was heat-treated in an atmosphere of hydrogen at 500° C. for 1 hour. The major phase in this preparation was identified by X-ray powder diffraction as a FCC structure with a cell parameter $a=3.585$ Å (cf nickel $a=3.524$ Å), confirming the presence of a nickel-molybdenum alloy having a molybdenum concentration of 13.5 atom %. The average crystallite size determined from the peak width at half-peak height of the 311 diffraction peak was 43 Å. The face centred cubic symmetry of the structure was confirmed by indexing the 111, 200, 220, 311 and 222 reflections.

The potential of the coated electrode after IR correction, was $-60$ mV versus Reversible Hydrogen electrode (RHE) at a current density of 0.5 A cm$^{-2}$ in 30 percent weight per volume KOH at 70° C. when used as hydrogen evolving cathode in a standard 3 compartment cell.

EXAMPLE 2

A coating was prepared by dipping a nickel mesh flag into a coating solution containing 80 atomic percent nickel and 20 atomic percent molybdenum as described in Example 1. As before it was first converted to the metal oxides and then reduced at 500° C. for 1 hour. The major phase in this preparation was identified as a face centred cubic structure with a cell parameter $a=3.567$ Å (cf nickel 3.524 Å), confirming the presence of a nickel-molybdenum alloy having a molybdenum concentration of 9.7 atom percent. The average crystallite size (see Example 1) was 54 Å.

The potential of the coated electrode was $-90$ mV versus RHE at a current density of 1 A cm$^{-2}$ in 30 percent weight per volume KOH at 70° C. when used as in Example 1.

EXAMPLE 3

NiW Alloy

Five milliliters of a solution containing 1.29 g of anhydrous nickel chloride dissolved in 20 ml of dry methanol was mixed with 5 ml of a solution containing 1.453 g of tungsten hexachloride dissolved in 20 ml of dry methanol. The resulting homogeneous solution contained nickel and tungsten in the atomic ratio 73/27.

A coating was prepared by dipping a sintered nickel flag into this coating solution. The nickel flag coated with the metal salts was treated as in Example 1 to convert them to the metal oxides and then was reduced at 500° C. for 2½ hours. The major phase in this preparation was identified as a face centred cubic structure with a cell parameter $a=3.564$ Å (cf nickel 3.524 Å), confirming the presence of a nickel-tungsten alloy having a tungsten concentration of 8.4 atom percent.

The electrode potential of the coated electrode at a current density of 1 A cm$^2$ at 70° C. was $-134$ mV (RHE) when used as in Example 1.

EXAMPLE 4

The following results on electrochemical activity of electrocatalytic coatings prepared from homogeneous solutions containing varying concentrations of molybdenum shows that below 10 atom % of Mo in solution there is a marked drop in activity. Below such concentrations of Mo in the homogeneous solution the electrocatalytically active alloys of the present invention are not formed. The measurements were again carried out using 30% aqueous KOH as electrolyte and the cathode potential vs RHE was measured when a current of 1 Amp/cm$^2$ was passed at 70° C., after applying IR correction.

| Effect of Molybdenum Content on the Activity of Electrocatalysts | |
|---|---|
| Heat treatment temperature | 500° C. |
| Current | 1A/cm$^2$ |
| Atomic % of Molybdenum Based on Total Metal in Homogeneous Solution | Electrode Potential vs RHE (mv) |
| 6.2 | $-297$ |
| 9 | $-200$ (approx) |
| 11.8 | $-80$ |
| 15 | $-88$ |
| 20 | $-90$ |

-continued

Effect of Molybdenum Content on the Activity of Electrocatalysts

| Heat treatment temperature | 500° C. |
| Current | 1A/cm² |

| Atomic % of Molybdenum Based on Total Metal in Homogeneous Solution | Electrode Potential vs RHE (mv) |
|---|---|
| 30 | −83 |
| 40 | −89 |

We claim:

1. An electrode having an electrocatalyst applied thereon, said electrocatalyst comprising a face-centered cubic alloy of nickel and from about 5 and 30 atom percent based on the alloy of at least one other metal selected from the group consisting of molybdenum and tungsten.

2. An electrode according to claim 1 wherein the electrocatalyst is a face-centred cubic alloy containing between 10 and 20 atom percent of molybdenum or tungsten.

3. An electrode substrate having a surface of nickel, iron, titanium or an alloy of two or more of said metals and an electrocatalyst applied to said surface, said electrocatalyst comprising a face centered cubic alloy of nickel and from about 5 to 30 atom percent based on the alloy of at least one other metal selected from the group consisting of molybdenum and tungsten.

* * * * *